United States Patent [19]

Nishimoto et al.

[11] Patent Number: 5,293,462
[45] Date of Patent: Mar. 8, 1994

[54] ELECTRONIC INFORMATION PROCESSING METHOD AND DEVICE FOR MODIFYING ELECTRONIC INFORMATION WITHOUT LOSING HIGH QUALITY THEREOF

[75] Inventors: Koichi Nishimoto; Toshihiro Hayashi, both of Hitachi; Keiji Oshima; Yukihiro Oda, both of Katsuta; Akira Sekine; Toshiaki Higashihara, both of Hitachioota; Kouhei Seki, Hitachi, all of Japan

[73] Assignees: Hitachi, Ltd., Tokyo; Hitachi Prosess Computer Engineering, Inc., Hitachi, both of Japan

[21] Appl. No.: 496,303

[22] Filed: Mar. 20, 1990

[30] Foreign Application Priority Data

Mar. 20, 1989 [JP] Japan .................................. 1-66210

[51] Int. Cl.⁵ .............................................. G06F 15/62
[52] U.S. Cl. .......................................... 395/100; 380/4
[58] Field of Search ............... 395/133, 155, 157, 159, 395/160, 161, 100, 118; 380/4, 25, 49; 364/419

[56] References Cited

U.S. PATENT DOCUMENTS 4,926,481 5/1990 Collins, Jr. ............................ 380/25
4,959,860 9/1990 Walters et al. ..................... 380/25 X

FOREIGN PATENT DOCUMENTS

58-53377 11/1983 Japan .
63-80329 4/1988 Japan .

Primary Examiner—Heather R. Herndon
Attorney, Agent, or Firm—Antonelli, Terry, Stout & Kraus

[57] ABSTRACT

Electronic information input via an input means is divided into first and second groups e.g. representing information which may not be modified except by a skilled operator, and information which may be modified freely. The information is stored in an information file and display elements are stored in e.g. a related information file. If a request for modification of one of the information elements is input via the input means, a judging means determines, on the basis of controlling information in a controlling information area, whether the information element belongs to the first or second group. If it belongs to the first, a display means displays one of the display elements as e.g. a warning to the operator that the information element may be modified only by a skilled operator. A password system may be provided to identify such a skilled operator.

23 Claims, 8 Drawing Sheets

* 1 : i REPRESENTS A SWITCHING FLAG.
* 2 : THESE FORMULAS ARE PROVIDED FOR DATA CORRECTION.

16 RELATED INFORMATION FILE

FIG. 5

| #2 | STATEMENT NO. | CONTENTS OF MODIFICATION | REASON OF MODIFICATION | DATE OF MODIFICATION | MODIFICATION OPERATOR |
|---|---|---|---|---|---|
| HISTORY OF MODIFICATION | 250 | 1.0 → 2.0 | CORRECTION VALUE MODIFICATION | 9/1/'88 | NISHIMOTO |
| | | | | | |

16 RELATED INFORMATION FILE

FIG. 7

| APPROVAL FOR MODIFICATION | STATEMENT NO. | APPROVAL DONOR | USER ID | PASSWORD | EXPIRATION |
|---|---|---|---|---|---|
| #2 | 250 | NISHIMOTO | 1234 | XXX | 12/31/'89 |
|  |  |  |  |  |  |

16 RELATED INFORMATION FILE

FIG. 9

| | (QUESTION) | | (CORRECT ANSWER) |
|---|---|---|---|
| #1: | WHAT DOES i MEAN ? | 1: SWITCHING FLAG 2: RECORD NUMBER | 1 |
| #2: | FOR WHAT THE STATEMENT NO. 250 IS NECESSARY ? | 1: SUMMATION 2: DATA CORRECTION | 2 |

16 RELATED INFORMATION FILE

ELECTRONIC INFORMATION PROCESSING METHOD AND DEVICE FOR MODIFYING ELECTRONIC INFORMATION WITHOUT LOSING HIGH QUALITY THEREOF

BACKGROUND OF THE INVENTION

1. Field of the Invention

The present invention relates to a method of processing electronic information, and also to a device for carrying out such a method. It is particularly, but not exclusively, concerned with a method of processing electronic information by modification of at least some of that information, such as modification of electronic documents prepared by word processor or modification of the source program for a computer.

2. Summary of the Prior Art

Several methods for processing electronic information have been proposed, which seek to control the modification of a source program of a computer, so as to prevent modifications which reduce the effectiveness of the source program. For example, in Japanese patent application No 63-80329 there was proposed a method of verifying a modification of a source program, in which the modified and unmodified source programs are compared. This method was particularly designed for error prevention during development of the source program. Also, in Japanese patent publication No 58-53377 there was proposed a method in which a record was made of which parts of the source program had been modified, and further modification of those already modified parts was limited, thereby limiting repeated modification of the program.

Furthermore, in the context of modifying electronic documents such as text or diagrams, it is known to provide a visual display of the modified document, for comparison with the unmodified document, either in printed form or in a display on a CRT (VDU).

It has been found, however, that the above methods of processing electronic information do not adequately control the modification of the information to prevent its effectiveness being reduced. For example, in Japanese 63-80329, the checking process is wholly automatic, and therefore the operator is given no warning when the proposed modification is unsatisfactory. In the method described in Japanese 58-53377, the control of modification is limited to those parts which have already been modified, and does not provide a general rule for controlling modification, irrespective of the previous history of modification.

SUMMARY OF THE INVENTION

Therefore, the present invention seeks to provide a method and apparatus for processing electronic information, which controls the processing more effectively than the prior art modification of the information.

The present invention proposes that the information be divided into a least two groups of elements, eg. corresponding to information elements which may be modified readily, and information elements which should be modified only in special circumstances or only by an experienced operator. Then, by associating further elements with the elements of information to be changed, the modification process may be controlled in dependence on those further elements.

For example, if those further elements are display elements, then if a request is input for modifying an element belonging to a group which should not be modified except by an experienced operator, a suitable display of this may be provided. In a development of this, that display element may be a request for input of a suitable password, which password is known only to an experience operator. It should be made clear that this password is a separate password to permit modification of specific information elements, and should not be confused with more basic passwords to enable initial interaction with the modification system.

In a further development, the information to be input by the experienced user, in order to modify specific information elements, may be related to those information elements themselves. This permits determination of the status of the user by checking whether the information input by the user does indeed have the desired relationship with the information to be modified. Effectively, the experience of the user is tested as a method of this arrangement of the present invention.

Thus, the present invention may provide a method in which, when a request for modification of one of the information elements is input to the system, it is determined whether that information element is particularly important, and a display may then alert the operator to the importance of the modification being proposed. The operator may also be presented with information relating to the history of modifications which have been made on that information element, so that he also knows how the information element has been changed previously. This offers the operator desirable information when modifying the information element. A further feature of the present invention, is that by checking on the status or ability of the user, it is possible to determine whether any particular modification should be made, and to prevent erroneous modification of the information, thereby preventing a deterioration in the quality of the informtion.

BRIEF DESCRIPTION OF THE DRAWINGS

Embodiments of the invention will now be described in detail, by way of example, with reference to the accompanying drawings in which.

DETAILED DESCRIPTION

Figure 1:
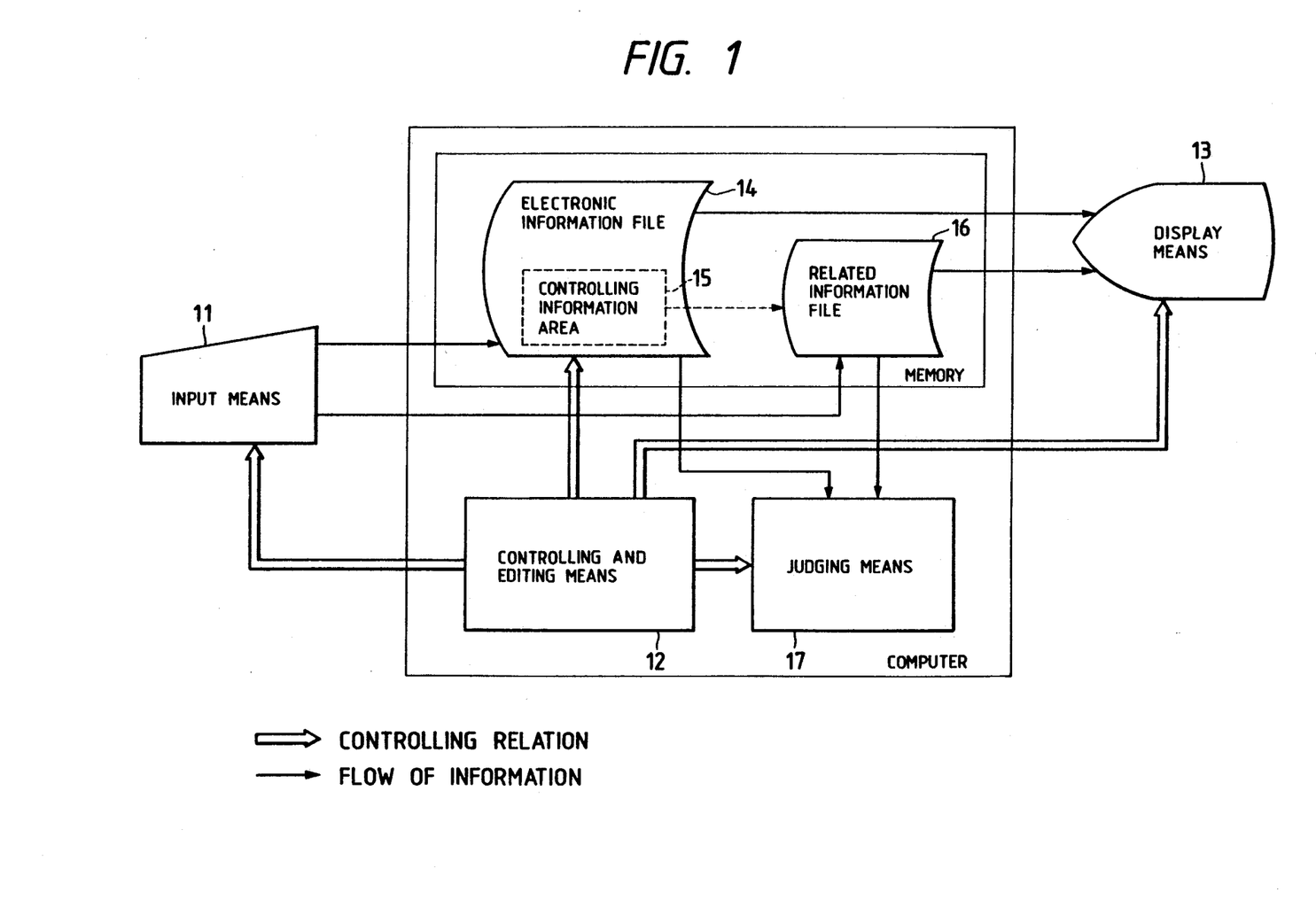
FIG. 1 shows schematically a block diagram of an embodiment of a device for modifying electronic information according to the present invention.

FIG. 1 shows a first embodiment of the present invention, being a system for processing electronic information in the form of a source program. In FIG. 1, there is shown an input means 11 for inputting electronic information, a controlling and editing means 12 for processing that electronic information, and a display means 13 for displaying appropriate information under control of the present invention. As shown in FIG. 1, the input means 11, the controlling and editing means 12 and the display means 13 are all connected to an electronic information file 14, which contains a controlling information area 15. There is also a related information file 16, to which further elements can be input via the input means 11, which further elements are related to the elements input to the information file 14.

The controlling information area 15 sets an address of a specified area for the file 14, and stores commands to be employed during the modification of the file 14. The related information file 16 stores other information elements which are related to the specified area in response to the address of the area 15.

Information elements are fed by input means 11 and is stored in the electronic information file 14. It may then be edited into the required document by the controlling and editing means 12. The modifying operation is carried out on the electronic information file 14 by using input means 11 while observing on the original script (displayed information) displayed on the display means 13. During this operation, an assessment is made to determine whether or not the controlling information area 15 contains information related to the information elements to be modified. If there is not, the operator can modify the information element without limitation. This assessment is made by judging means 17.

If there is some information in the controlling information area 15, this information or the information existing in the related information file 16 are submitted to judgement by the judging means 17 to determine whether or not either of them is the information for judgment of the modification. If the information is that for judgement, the controlling and editing means 12 acts to prohibit modification or to display test questions. Modification may then be permitted or prohibited in dependence on the test results.

On the other hand, if the information in question is not the one for judgment of the modification, only a warning or a display of the related information by the display means 13 are carried out in order to direct attention of the operation to the modification.

The above applies irrespective of the type of information. There now follows a more detailed explanation, wherein this embodiment of the invention is applied to modification of a source program as an example of the electronic information.

Figure 2:
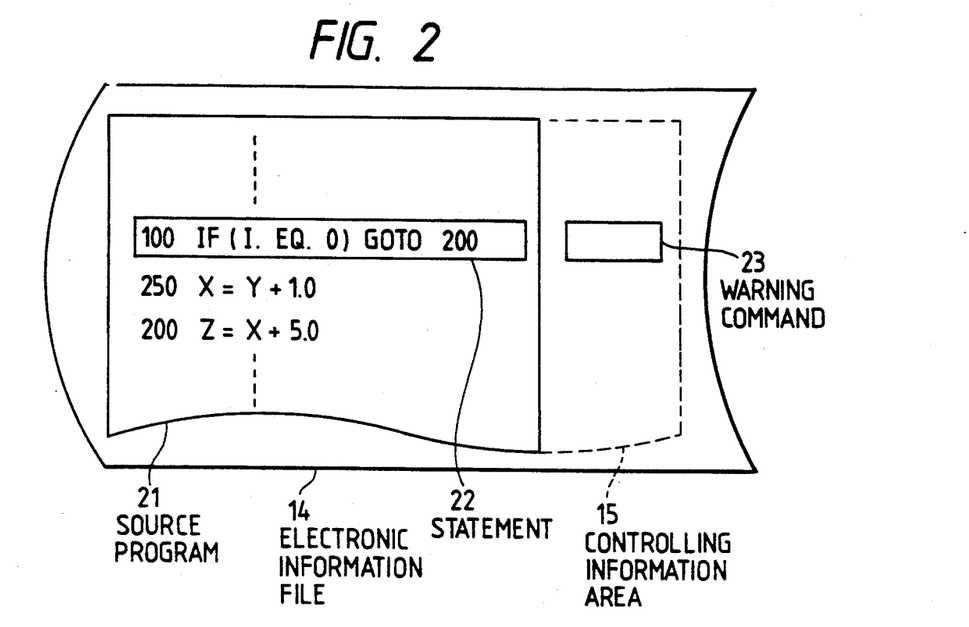
FIGS. 2 and 3 illustrate electronic information files used in the embodiment FIG. 1.

In FIG. 2, a source program 21 is stored in the electronic information file 14 which source program 21 contains a statement 22 which is an important criterion of the source program 21. Care must be taken not to degrade the quality (function) of the program 21 by subsequent modification of the statement 22. Hence, a warning command 23 is set in the controlling information area 15 corresponding to the statement.

If there is an attempt to modify the statement 22 of the source program 21, the judging means 17 will judge whether or not there is a warning command 23 corresponding to the statement 22 in the controlling information area 15. If there is, the display means 13 displays a warning. The warning may be in the form of a message information, sound, or light.

By their actions, a warning is given when there is an attempt to modify the particular area of a source program, which has been previously specified as important. This alerts the operator so that he may be attentive.

Figure 3:
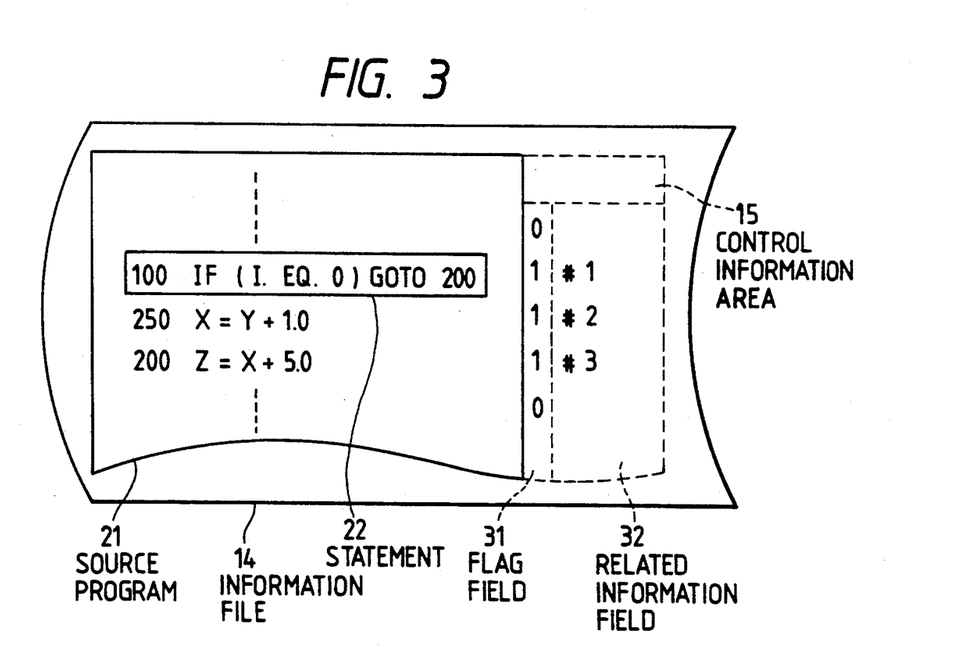

FIG. 3 shows an embodiment of the invention where a flag field 31, which indicates related information in the related information file 16, and a related information field 32 are prepared in the controlling information area 15 in the electronic information file 14. A sign bit eg. of logic '1' is stored in the flag field 31 which corresponds to the statement 22 which has been determined to be important. Addresses (#1, #2, . . . ) of the related information file 16 to which reference is made are arranged in the corresponding related information field 32.

Figure 4:
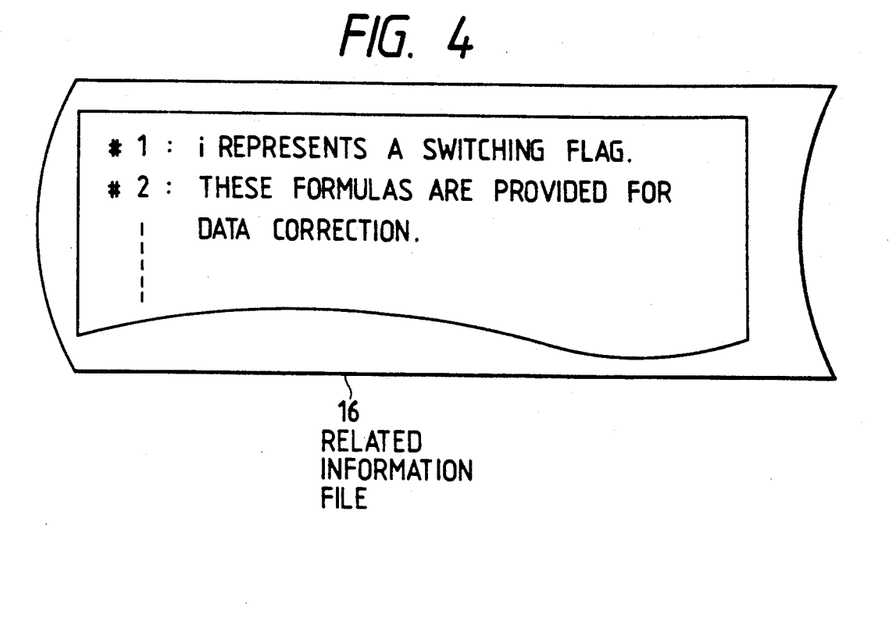
FIGS. 4 and 5 show further information files related to the information files in FIGS. 2 and 3.
Figure 5:
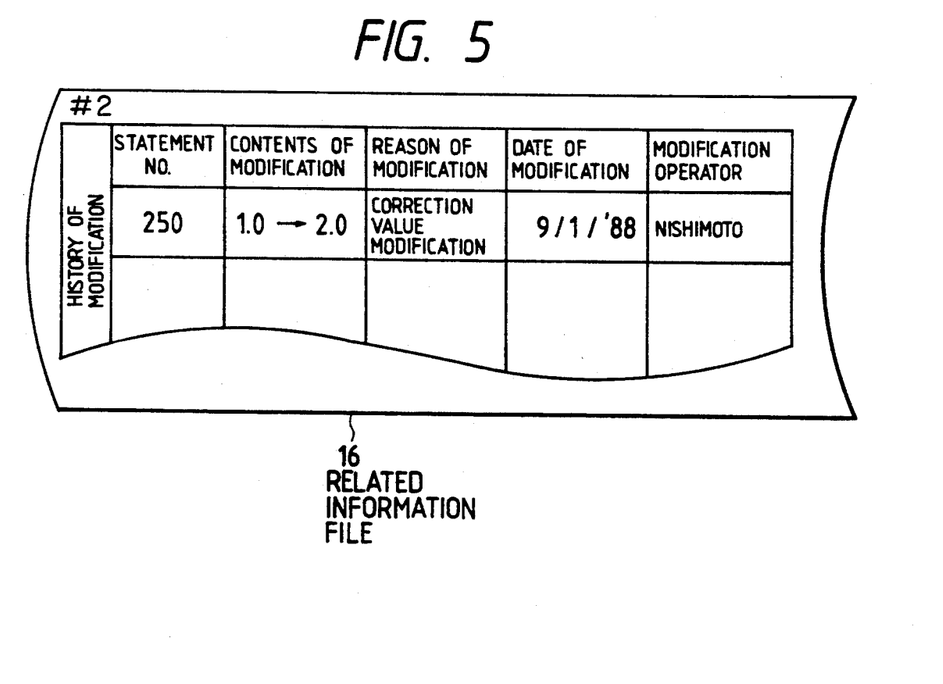

The instruction for modification (explanation for the concerning area, reference materials, modification procedures, remarks etc.), the history of past modification (content of modification, reason for modification, date of modification, modification operator etc. for each statement number of the specified area of the object electronic information) can be stored in the related information file 16. FIG. 4 shows an arrangement corresponding to the former situation (ie. instruction for modification) and FIG. 5 shows an arrangement corresponding to the latter situation (ie. history of part modification). Both are subject to judgment as to whether or not the information existing in the related information file 16 be displayed, by the judging means 17 with the sign bit in the flag field 31. Then with the result, the information in the related information file 16 is displayed by the display means 13.

Figure 6:
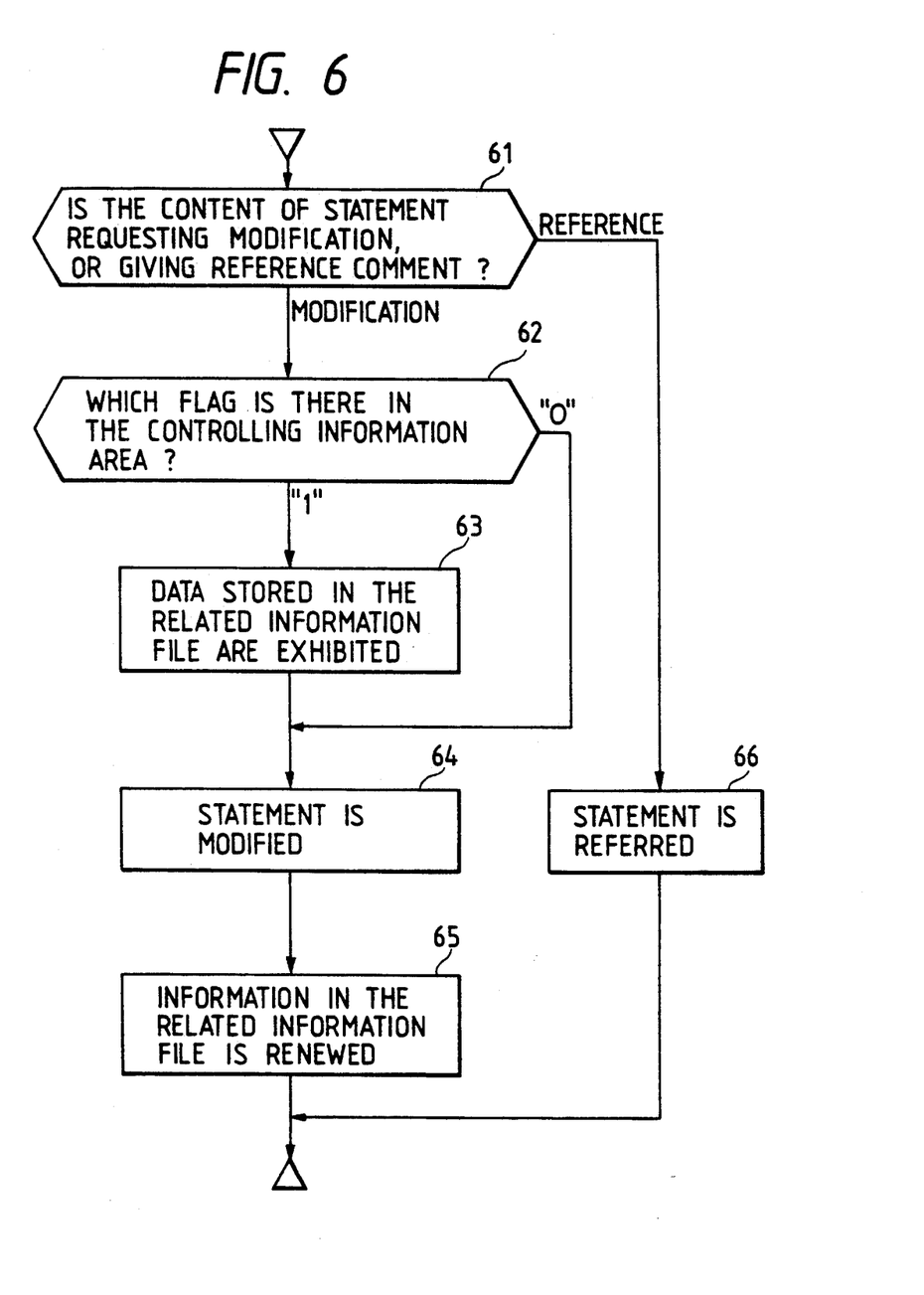
FIG. 6 is a flow chart showing steps in the modification operation to be applied to the information files of FIGS. 4 and 5.

FIG. 6 is a flow chart of the operation for modifying the source program 21 using above procedures.

Step 61: A positive or negative judgment for modifying the content of a statement in the source program 21 is made. This judgment is carried out by the controlling and editing means 12. For a reference case only, processing proceeds to step 66.

Step 62: When the statement to be modified is important, a judgment is made as to whether or not there is a corresponding sign bit in the flag field 31 in the controlling information area 15. This judgment is carried out by the judging means 17. If there is no corresponding bit, processing proceeds to step 64.

Step 63: Where there is a corresponding bit, at logic '1' the information stored in the specified part of the related information file 16 which is indicated by the related information field 32 is displayed. The display is carried out by the display means 13.

Step 64: The statement is modified. The modification operation is carried out using input means 11 and editing means 12, with sufficient understanding of the displayed messages appearing on the display means 13.

Step 65: If the information stored in the related information file 16, corresponding to the statement, is changed as the result of the modification operation, the information will be renewed. In addition, if some change in the controlling information area 15 results from the modification operation, it will also be renewed.

Step 66: This operation does not include modification, therefore, only the concerned statement is referred to.

In the present embodiment, if the important part of the source program 21 specified in advance is subject to modification, related information for the corresponding part (explanation of function, reference materials, modification measures, remarks, and history of past modification etc.) may be outputted and displayed in a multi-window format or a monitor-viewer format. This not only alerts an operator, but also offers him necessary information. This results in improved working efficiency and prevents degradation of the electronic information.

Figure 7:
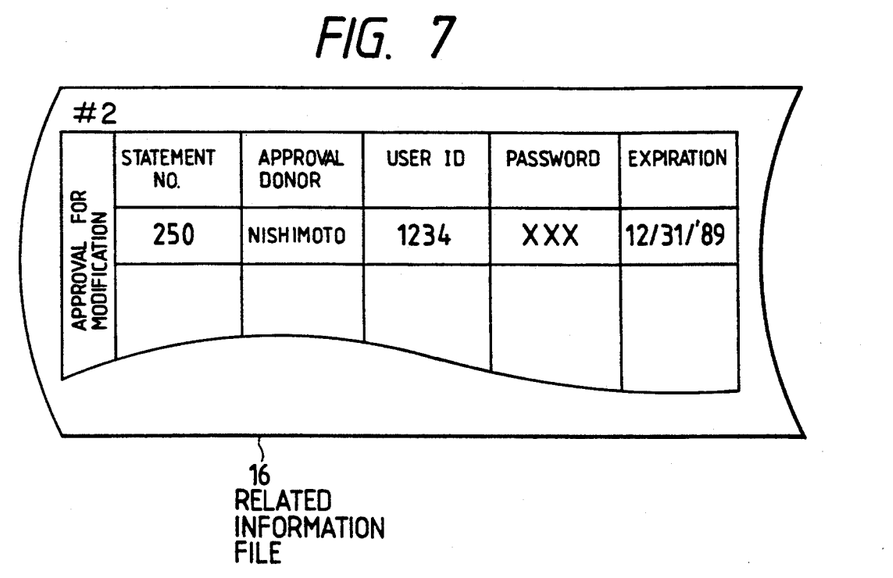
FIG. 7 is yet another information file.
Figure 8:
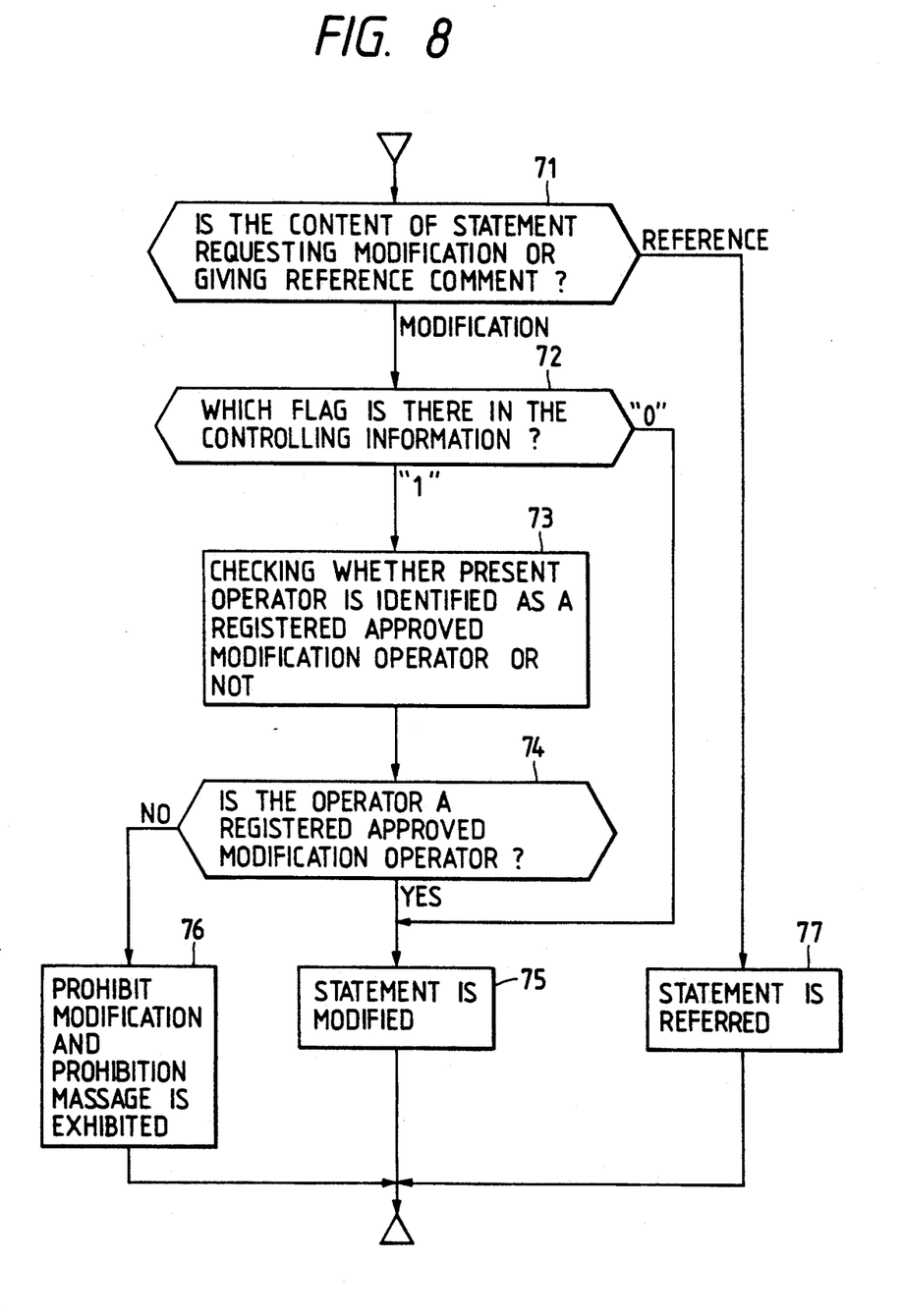
FIG. 8 is a flow chart showing modification of the information file of FIG. 7.

Next, reference is made to FIGS. 7 and 8, which show an embodiment of the present invention where there is a check to determine whether or not the operator requesting the modification is a previously approved person for the particular statement for which a request for performing a modification has been input. FIG. 7 shows the information, for judging whether or not the operator is approved, which information is stored in the related information file 16. In this embodiment, the name of the approved operator, the user ID, the password, the expiry date of approval of the operator, etc. are specified for every statement No. of the specified areas in the electronic information.

FIG. 8 is a flow chart of the operation in this case.

Step 71: The same as step 61 in FIG. 6.

Step 72: The same as step 62 in FIG. 6.

Step 73: When the sign bit at logic '1' is present, the identification of an approved operator is carried out at the specified part of the related information file 16 which is indicated by the related information field 32. The identification is carried out by the judging means 17.

The modification operator sets his (her) user ID and password in advance by using the input means 11.

Step 74: If the operator is not approved, processing proceeds to step 76.

Step 75: The statement is modified by an approved operator.

Step 76: The modification of the statement is prohibited by the controlling and editing means 12. In addition, a message is output which says that the modification of the statement is now allowed.

Step 77: The same as step 66.

When it is determined that modification is not allowed, the modification of the concerned statement is prohibited by the controlling and editing means 12. However, it is possible that only a message may be output denying the modification.

Further, the modifying operation may be confirmed as 'only deletion prohibited' or 'only addition prohibited'.

If the same approval condition is effective for more than one specified area of the electronic information, the judgment in one specified area applies for all the other specified areas eliminating other judgments.

This invention, in the modification of the specified area of the object electronic information, not only alerts the operator, but also makes it possible that only a qualified operator will be able to modify the specified area. This reduces the risk of quality degradation.

Figure 9:
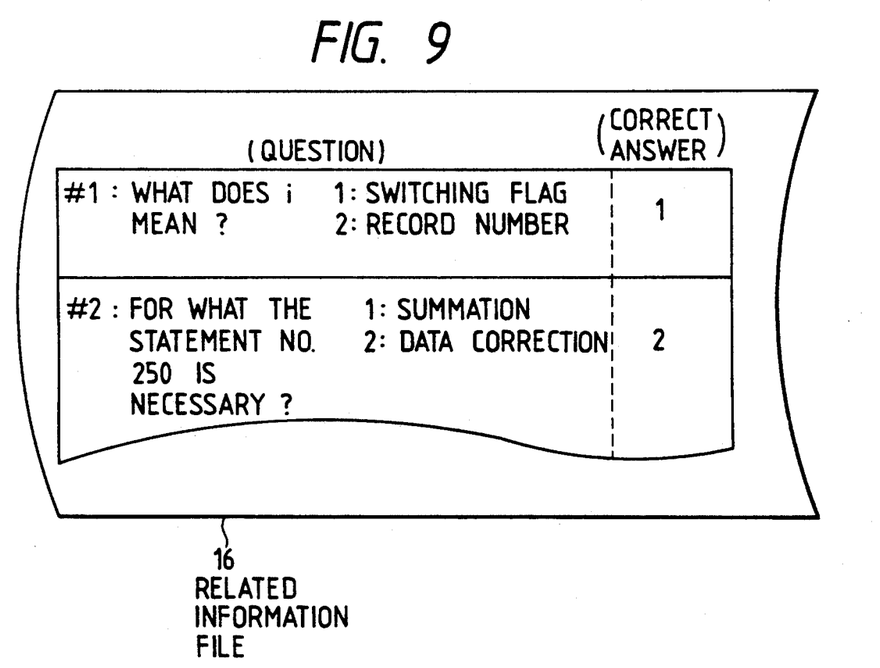
FIG. 9 shows yet another information file.
Figure 10:
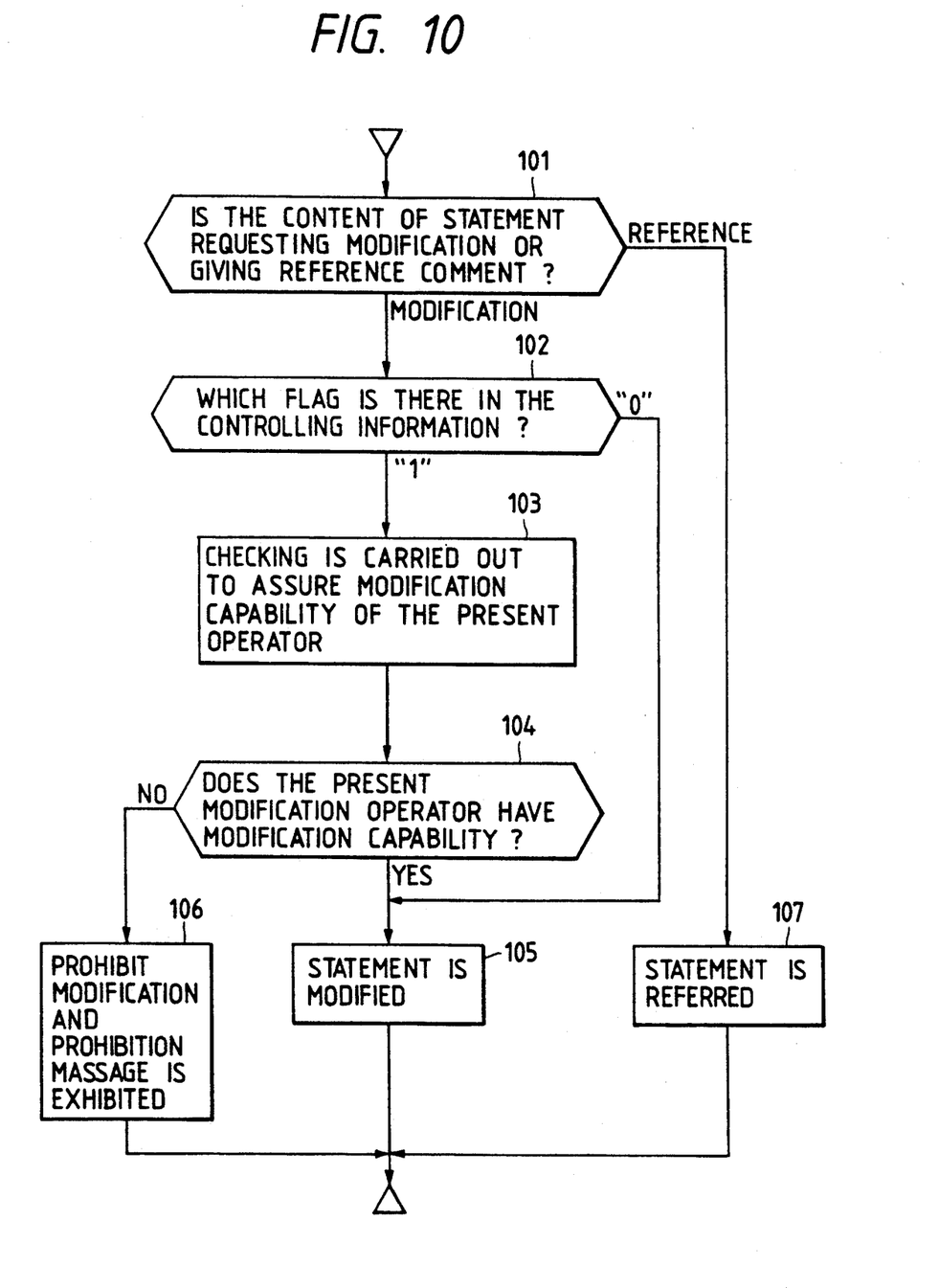
FIG. 10 is a flow chart illustrating the modification of the information file FIG. 9.

FIG. 9 shows an embodiment of the invention where the information to be used in testing whether or not a operator has knowledge concerning the part to be modified is stored in the related information file 16. The questions stored in the related information file 16 are shown by the display means 13, and the judging means 17 judges whether the operator's answer matches with the correct answer stored in the file 16. FIG. 10 shows a flow chart for the operation of this embodiment.

Step 101: The same as step 71 in FIG. 7.

Step 102: The same as step 72 in FIG. 7.

Step 103: The question relating to the specified part are extracted from a collection of questions previously stored in the modification information file 16. These are indicated to the operator. The operator's answers are compared with the correct answers stored in the collection of questions and the judging means 17 assesses the operator's capability to carry out the modification.

Step 104: If the result of the check in Step 103 shows the operator not capable of carrying out the modification, then processing proceeds to Step 106.

Step 105: The same as Step 75 in FIG. 7.

Step 106: The same as Step 76 in FIG. 7.

Step 107: The same as Step 77 in FIG. 7.

If the operator is judged capable of carrying out the modification, after checking with the collection of questions stored in the modification information file 16, the operator's information (name, password, date, etc.) is stored. This allows the option of bypassing the capability test when that operator next attempts to modify the information.

In addition, by co-relating the contents of the questions for each of the specified areas, it is possible to bypass the latter test, since the operator will be assessed as able to answer the latter questions because he has already answered the former questions.

With embodiment, during modification of a specified area of the object electronic information, not only is the operator alerted, but the operator's capability for modification is also checked for each specified area of the electronic information. The modification operation is prevented when the operator is judged incapable of correctly carrying out the modification. This results in the prevention of quality degradation of the electronic information.

Figure 11A:
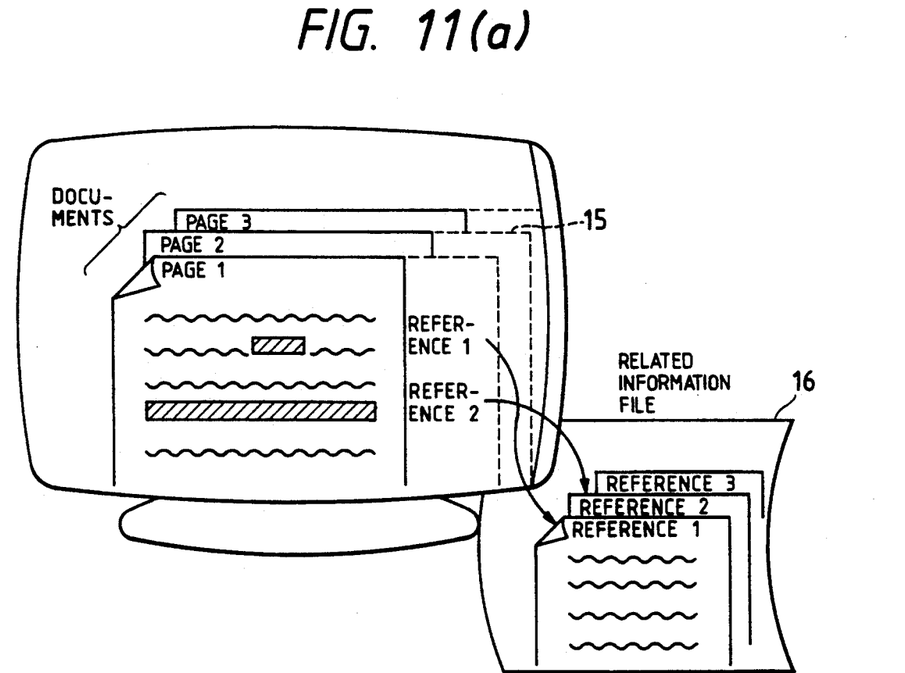
FIGS. 11(a) and 11(b) show a further embodiment of the present invention, for modifying electronic information in the form of a document.
Figure 11B:
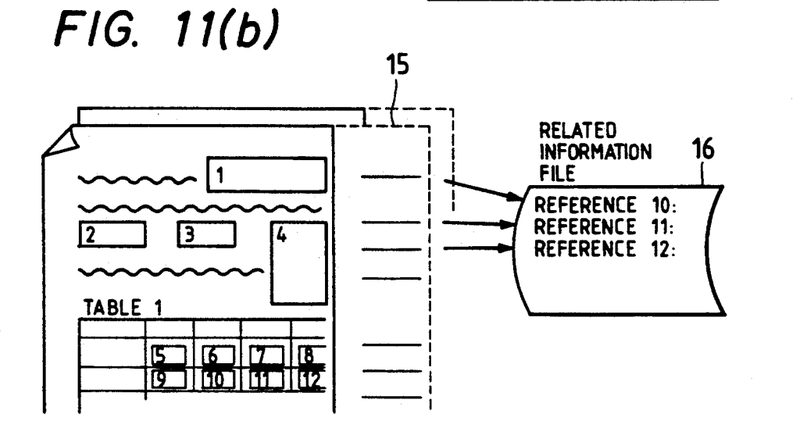

FIG. 11 shows an embodiment of the present invention in which the electronic information is represented by document characters, diagrams, graphs, or combination of them which are prepared by a word processor or a personal computer. The method of the modification is substantially the same as that employed in the case of a program as described above.

In FIG. 11(a), for example, the hatched lines and words on page 1 of the document are an important part, and in FIG. 11(b), particular areas No. 1 to n (n=12) of a similar document are important parts, so they are previously specified as important in the controlling information area (15). The modification information file 16 is referred via the controlling information area 15.

It is also possible for the controlling information area 15 to stand for the related information file 16, in the case of documents. Normally, only the source program or original document are displayed on a screen such as a CRT (VDU). However, in this case such a display can be extended also to include the controlling information area.

It is also possible to utilize various functions such as a simple warning, display of the related information, approval of the operator and the test of the capability of the operator, individually or together depending on the respective importance of the electronic information to be modified. For example, the above mixing can be identified by a kind of flag which is stored in the flag field 31.

Furthermore, it is also possible to separate these mixed functions into a level such as a simple warning, displaying the related information or checking the modification capability, with regard to modification for the specified part of the object electronic information, by identifying the password keyed-in on a terminal computer at the beginning of the modification operation.

Thus, according to the present invention, parts of a document or program are identified to be particularly important, so that the attention of the operator may be drawn to the importance of those parts, when an attempt is made to modify them. This may involve only display of a warning to the operator, but may also involve display of modification history and may further permit interlocking of the modification (i.e. preventing that modification) if desired. Furthermore, the ability of the operator may be checked. In this way, the reliability of the electronic information (i.e. document or program) is maintained by preventing erroneous modification, and the process for carrying out that modification may be enhanced by displaying information to the operator.

What is claimed is:

1. A method in a computer system, of processing and electronically modifying information elements, comprising the steps executed by said computer system of:
   inputting a plurality of information elements, said plurality of information elements including at least first and second groups of information elements;
   inputting a plurality of display information elements;
   associating each of said plurality of display information elements with a corresponding element of said first group of information elements;
   inputting a request for modification of one of said plurality of information elements;
   determining which of said first group and said second group contains said one of said plurality of information elements to be modified; and
   displaying a display element corresponding to said one of said plurality of information elements to be modified when said one of said plurality of information elements to be modified is included in said first group.

2. A method according to claim 1, further including the step of modifying said one of said plurality of information elements according to said modification when said one of said information elements is included in said plurality of first group.

3. A method according to claim 1, wherein if said one of said plurality of information elements is included in said first group, the corresponding display element is a request for input of a predetermined password and said method further comprises modifying said one of said plurality of information elements according to said modification request only after input of said predetermined password if said one of said plurality of information elements is included in said first group.

4. A method according to claim 3, wherein said password is related to the corresponding one of said plurality of information elements.

5. A method according to claim 1, wherein if said one of said plurality of information elements is included in said first group, the corresponding one of plurality of display elements is a request for input of response data relating to said one of said plurality of information elements, said method further comprising analyzing said response data to determine if said response data has a predetermined relationship with said one of said plurality of information elements, and modifying said one of plurality of information elements according to said modification only when said response data has said predetermined relationship with said one of said plurality of information elements.

6. A method according to claim 1, wherein said determining of which of said first group or said second group contains said one of said information elements is on the basis of a flag of a flag field associated with said display elements.

7. A method, in a computer system, of processing and electronically modifying information elements, comprising the steps executed by said computer system, of:
   inputting a plurality of information elements, said plurality of information elements including at least first and second groups of said plurality of information elements;
   inputting at least one request element, said at least one request element being a request for input of a corresponding password;
   associating said at least one request element with at least one information element of said first group of said plurality of information elements;
   inputting a request for modification of one of said plurality of information elements;
   determining which of said first group and said second group contains said one of said plurality of information elements to be modified; and
   modifying said one of said plurality of information elements to be modified according to said modification request only after input of the request or said corresponding password associated with said at least one information element if said one of said plurality of information elements to be modified is included in said first group.

8. A method according to claim 7, wherein said determining of which of said first group or said second group contains said one of said information elements is on the basis of a flag of a flag field associated with said at least one request element.

9. A method, in a computer system of processing and electronically modifying information elements, comprising the steps executed by said computer system, of:
   inputting a plurality of information elements, said plurality of information elements including at least a first group and a second group of said plurality of information elements;
   inputting at least one request element, said at least one request element being a request for input of a corresponding password;
   inputting a plurality of display information elements;
   associating each of said plurality of display information elements with corresponding one of said first group of said plurality of information elements;
   associating said at least one request element with at least one information element of said first group of said plurality of information elements;
   inputting a request for modification of one of said plurality of information elements;
   determining which of said first group and said second group contains said one of said plurality of information elements;
   displaying one of said display information elements corresponding to said one of said plurality of information elements and requesting input of response data relating to said one of said display information elements when said one of said display information elements is included in said first group; inputting said response data when one of said display information elements is included in said first group;
   inputting said response data when said one of said display elements is included in said first group;
   analyzing said response data to determine if said response data has a predetermined relationship with said one of said plurality of information elements; and modifying said one of said plurality of information elements only when said response data has said determined relationship with said one of said plurality of information elements if when said one of said display elements is included in said first group.

10. A method according to claim 9, wherein said determining of which of said first group or said second group contains said one of said plurality of information elements is on the basis of a flag of a flag field associated with said at least one request element.

11. A method in a computer system, of electronically modifying information elements, wherein said electronic information element comprises a plurality of information elements, said plurality of information elements including at least a first group and a second group of said information elements, and a plurality of request elements, each of said request elements being associated with corresponding one of said first group of information elements; said method comprising the steps executed by said computer system, of:

inputting a first password;

determining if said first password is one of a plurality of predetermined passwords;

permitting input of a request for modification of one of said plurality of information elements only if said first password is included in said first plurality of passwords;

determining if said one of said information elements is included in said first group or said second group;

modifying said one of said plurality of information elements when said one of said information elements is included in said second group and requesting input of one of at least one further passwords wherein said one of said plurality of information elements is included in said first group;

inputting a second password when said one of said plurality of information elements is included in said first group;

modifying said one of said plurality of information elements only if said second password corresponds to one of said at least one further passwords if said one of said elements is included in said first group.

12. A method according to claim 11, wherein said plurality of request elements each correspond to a display element, and said request for modification input of one of said at least one further password comprises displaying the display element corresponding to said one of said information elements.

13. A method according to claim 11, wherein said determining of which of said first group and said second group contains said one of said information elements is on the basis of a flag of a flag field associated with said display elements.

14. A method, in a computer system, of electronically modifying information elements wherein said information elements comprises a plurality of information elements, said plurality of information elements including at least a first group and a second group of said plurality of information elements, and a plurality of request elements, each of said request elements being associated with at least one of said first group of information elements; said method comprising:

inputting a first password;

determining if said first password is one of a first plurality of predetermined passwords;

permitting input of a request for modification of one of said information elements only of said first password is included in said first plurality of predetermined passwords;

determining if said one of said information elements is included in said first group or said second group of said plurality of information elements;

modifying said one of said information elements when said one of said information elements is included in said second group and requesting input of response data relating to the nature of said one of said display elements when said one of said display element is included in said first group;

inputting said response data when said one of said information elements is included in said first group;

analyzing said response data to determine if said response data has a predetermined relationship with said one of said information elements; and modifying said one of said information elements only when said response data has said predetermined relationship with said one of said information elements when said one of said display elements is included in said first group.

15. A method according to claim 14, wherein said determining of which of said first group of said second group contains said one of said information elements is on the basis of a flag of a flag field associated with said request elements.

16. An apparatus for processing information elements electronically by using a computer system comprising:

means for inputting a plurality of information elements said plurality of information elements including at least a first group and a second group of said elements, for inputting a plurality of display elements, and for inputting a request for modification of one of said information elements;

means for associating each of said plurality of display elements with at least one of said first group of said information elements, means for determining which of said first group and said second group contains said one of said information elements; and means for displaying the display element corresponding to said one of said information elements when said one of said information elements is included in said first group.

17. An apparatus according to claim 16, wherein, when said one of said information elements is included in said first group, the corresponding display element is a request for input of a predetermined password and said apparatus further comprises means for modifying said one of said information elements according to said modification request only after input of said predetermined password if said one of said information elements is included in said first group.

18. An apparatus according to claim 16, wherein if said one of said elements is included in said first group, the corresponding display element is a request for input of corresponding display element is a request for input of response data relating to the nature of said one of said information elements, said apparatus further comprising means for analyzing said response data to determine if said response data has a predetermined relationship with said one of said information elements, and means for modifying said information element according to said modification only when said response data has said predetermined relationship with said one of said information elements.

19. An apparatus for processing information elements electronically by using a computer system, comprising;
- means for inputting a plurality of information elements, said plurality of information elements including at least a first group and a second group of said information elements, for inputting at least one request element, said at least one request element being a request for input of a corresponding password, and for inputting a request for modification of one of said plurality of information elements;
- means for associating said at least one request element with at least one one of the first group of said information elements;
- means for determining which of said first group and said second group contains said one of said plurality of information elements; and
- means for modifying said one of said information elements according to said modification request only after input of the request or the corresponding password associated with said one of said information elements if said one of said information elements is included in said first group.

20. An apparatus for processing information elements electronically by using a computer system, comprising:
- means for inputting a plurality of information elements, said plurality of information elements including at least a first group and a second group of said information elements, for inputting at least one request element, said at least one request element being a request for input of a corresponding password, for inputting a request for modification of one of said plurality of information elements;
- means for associating said at least one request element with at least one element of the first group of said information elements;
- means for determining which of said first group and said second group contains said one of said plurality of information elements;
- means for modifying said one of said information elements where said one of said information elements is included in said second group and requesting input of response data relating to the nature of said one of said display elements when said one of said display elements is included in said first group;
- said inputting means also being arranged for inputting said response data when said one of said display elements is included in said first group;
- means for analyzing said response data to determine if said response data has a predetermined relationship with said one of said plurality of information elements; and
- means for modifying said one of said information elements only when said response data has said predetermined relationship with said one of said information elements if when said one of said display elements is included in said first group.

21. An apparatus for modifying information elements electronically by using a computer system, wherein said electronic information comprises a plurality of information elements, said plurality of information elements including at least a first group and a second group of said information elements, and a plurality of request elements, each of said request elements being associated with at least one of said first group of information elements; said apparatus comprising:
- means for inputting a first password;
- means for determining if said first password is one of a first plurality of predetermined passwords;
- means for permitting input of a request for modification of one of said plurality of information elements only when said first password is included in said first plurality of passwords;
- means for determining if said one of said information elements is included in said first group or said second group;
- means for modifying said one of said plurality of information elements when said one of said information elements is included in said second group and for requesting input of one of at least one further passwords wherein said one of said information elements is included in said first group;
- said means for inputting a first password being arranged for permitting input of a second password when said one of said information elements is included in said first group;
- means for modifying said one of said information elements only if said second password corresponds to one of said at least one further passwords if said one of said information elements is included in said first group.

22. An apparatus according to claim 21, wherein said password is related to the nature of the corresponding information element.

23. An apparatus for modifying information elements electronically by using a computer system, wherein said electronic information comprises a plurality of information elements, said plurality of information elements including at least a first group and a second group of said information elements, and a plurality of request elements, each of said request elements being associated with corresponding one of said first group of information elements; said apparatus comprising:
- means for inputting a first password;
- means for determining if said first password is one of a first plurality of predetermined passwords;
- means for permitting input of a request for modification of one of said plurality of information elements only when said first password is included in said first plurality of passwords;
- means for determining if said one of said information elements is included in said first group or said second group of said plurality of information elements;
- means for modifying said one of said information elements when said one of said information elements is included in said second group and requesting input of response data relating to the nature of said one of said display elements is included in said first group, said means for inputting a first password also being arranged for inputting said response data when said one of said information elements is included in said first group;
- means for analyzing said response data to determine if said response data has a predetermined relationship with said one of said information elements; and
- means for modifying said one of said information elements only when said response data has said predetermined relationship with said one of said information elements when said one of said information elements is included in said first group.

* * * * *